United States Patent [19]
Kotani

[11] Patent Number: 5,461,441
[45] Date of Patent: Oct. 24, 1995

[54] CAMERA WITH SWITCHING MECHANISM FOR SELECTIVE OPERATION OF A RETRACTABLE LENS BARREL AND CLOSEABLE LENS BARRIER AND METHOD OF OPERATION

[75] Inventor: Noriyasu Kotani, Tokyo, Japan

[73] Assignee: Nikon Corporation, Tokyo, Japan

[21] Appl. No.: 258,231

[22] Filed: Jun. 10, 1994

[30] Foreign Application Priority Data

Jun. 25, 1993 [JP] Japan .................... 5-177588

[51] Int. Cl.$^6$ ............................ G03B 17/04
[52] U.S. Cl. ..................... 354/187; 354/195.1
[58] Field of Search ................ 354/187, 195.1, 354/195.12, 202, 253, 288

[56] References Cited

U.S. PATENT DOCUMENTS

| | | | |
|---|---|---|---|
| 4,806,961 | 2/1989 | Kamitani et al. | 354/195.1 |
| 4,876,563 | 10/1989 | Ishida et al. | 354/253 X |
| 5,051,765 | 9/1991 | Yoshizaki et al. | 354/187 |
| 5,274,410 | 12/1993 | Kuwada et al. | 354/226 |

FOREIGN PATENT DOCUMENTS

| | | |
|---|---|---|
| 62-113335 | 7/1987 | Japan . |
| 1-288842 | 11/1989 | Japan . |
| 6-130477 | 5/1994 | Japan . |

Primary Examiner—Russell E. Adams
Assistant Examiner—J. K. Han
Attorney, Agent, or Firm—Oliff & Berridge

[57] ABSTRACT

A camera uses a drive mechanism to scroll a lens barrel in and out of a camera body and to open and close a lens barrier that covers the front of the lens barrel. A spring is attached to the lens barrier, providing a spring force in the closing direction of the barrier and thereby preventing motion of the barrier in the opening direction of the barrier under an external force. A single electric motor is provided for driving a switching device, which includes a series of gears. The switching device switches power transmission of the motor between the lens barrel and the lens barrier, depending on the direction of rotation of the motor. Switching between scrolling in and out of the lens barrel and opening and closing of the lens barrier is possible only when the lens barrier can move in front of the lens barrel.

23 Claims, 7 Drawing Sheets

CAMERA WITH SWITCHING MECHANISM FOR SELECTIVE OPERATION OF A RETRACTABLE LENS BARREL AND CLOSEABLE LENS BARRIER AND METHOD OF OPERATION

BACKGROUND OF THE INVENTION

1. Field of the Invention

The present invention relates to a camera, and more particularly, to a camera equipped with a lens protection barrier (i.e., a lens cover) that opens and closes in front of a lens barrel that holds a photographic lens.

2. Description of Related Art

With so-called collapsible-mount-type cameras, a lens barrel of the camera scrolls into a position within the camera body when the camera is not in use and scrolls out to a position protruding from the camera body when the camera is in use. Various known lens barriers can selectively cover the front side of the lens barrel, or can be opened and closed to protect the photographic lens.

One such lens barrier is disclosed in Japanese Patent publication No. 62-113335. This kind of lens barrier opens by moving along the front side of the camera to withdraw from the surface of the photographic lens when the camera is in use, and closes by moving in the opposite direction to cover the surface of the photographic lens when the lens barrel is collapsed and withdrawn into the camera body when the camera is not in use.

In such collapsible-mount-type cameras, however, a problem can arise during opening and closing of the lens barrier. Damage can occur because of interference or collision between the lens barrier and the lens barrel when an attempt is made to close the lens barrier while the lens barrel holding the photographic lens is scrolled out and protrudes from the camera, or when an attempt is made to scroll out the lens barrel while the barrier is closed.

To prevent this problem, a known camera, disclosed in Japanese Patent publication No. 1-288842, includes a lens barrier on the front of the camera that can be slid manually along the front of the camera so as to withdraw from the front of the photographic lens when the camera is in use. When the camera is not in use, the barrier can be slid along the front of the camera so as to cover the front of the photographic lens when the lens barrel is collapsed and withdrawn into the body of the camera.

The barrier of this conventional camera cannot be closed when the lens barrel is scrolled out and protrudes from the camera. A detection device continuously detects whether the barrier is in an open position or a closed position, so that scrolling the lens barrel out is allowed only when the barrier is open, that is, only when the barrier has been withdrawn from in front of the photographic lens. However, in this conventional camera, although manual closing of the barrier is only permitted when the lens barrel has been scrolled in and is in the collapsed state, manual opening and closing of the barrier is still required. Although the structure is simple, problems related to manual operation can still arise during operation of the camera.

To address these problems, recent cameras include a drive source, such as an electric motor, to automate the operations of scrolling the lens barrel in and out and opening and closing the lens barrier. Additional problems can arise in such automated cameras because damage can occur due to interference and collision between the lens barrier and the lens barrel.

In one known camera, the front of the lens barrel is selectively covered by the lens barrier, and a cam is provided for closing the barrier. The cam is also part of the drive mechanism used to drive the lens barrel during scrolling of the lens barrel in and out of the camera body. Opening and closing of the barrier and movement of the lens barrel are thus linked. Problems can arise with this kind of conventional structure, however, because the closing of the barrier is linked to the scrolling action of the lens barrel. When the lens barrel is driven by means of a helicoid (i.e., a screw drive), for example, after the lens barrel has been withdrawn to a position where the barrier can move in front of it, to close the barrier it is necessary to additionally rotate the helicoid through a preset amount of rotation. This causes the lens barrel to move farther in the collapsing direction than necessary, by the amount of the additional rotation required to close the barrier. As a result, the additional space where the lens barrel moves is wasted. Other components of the camera cannot be positioned in that space, presenting design-related problems and making the camera less compact.

On the other hand, when the lens barrel is driven by a cam ring, it is possible to eliminate the wasted space by taking into consideration the shape of cam grooves on the cam ring so that the lens barrel does not move forward or backward even when the cam ring rotates. To keep the lens barrel from moving forward or backward, however, it is necessary for the rear edge of the cam groove to face the perimeter of the cam ring. Because there are limits to the groove width and number of cam grooves that can be formed on the cam ring, limitations are placed on the freedom of design in this type of lens barrel as well.

It is particularly desirable to overcome problems such as those described above when the scrolling of the lens barrel in and out and the opening and closing of the lens barrier are automated by a drive source, such as an electric motor.

Furthermore, with the lens barriers described above, when the lens barrier is in the closed position covering the front of the lens barrel, there are times when an unanticipated external force is applied. It is desirable to prevent the effects of this external force. It is possible to protect the lens barrier and camera body from external forces by preventing the lens barrier from moving towards its open position, or by smoothly moving the lens barrier to its open position without opposing the external force.

An example of a model in which movement towards the open position is prevented, even in the presence of an external force on the lens barrier, is disclosed in Japanese Patent publication No. 4-301544. When the lens barrier covers the front of the lens barrel, the opening in the camera body cover is completely plugged and the barrier does not open, even if an external force is applied. This structure is advantageous because the camera body is sealed, stable and has a fully flat design, enabling it to fit easily into its carrying case.

Because a convex part that covers and uncovers the camera body opening is provided on the lens barrier, however, plugging the cover opening as described above requires moving the lens barrier in the direction of the optic axis. Moreover, it also is necessary to link the lens barrier motion with the scrolling in and out of the lens barrel, making the structure complex and increasing cost. Furthermore, space is needed to accommodate movement of the barrier in the direction of the optic axis, making the camera less compact.

SUMMARY OF THE INVENTION

It is an object of the present invention, which was developed with due regard to the above considerations, to provide a camera with a lens barrier that can be suitably operated without creating problems related to the durability of the various components or the drive mechanisms for the lens barrier, which opens and closes in front of the lens barrel, and for the lens barrel, which scrolls in and out of the camera body.

To achieve the above and other objects, a camera according to an embodiment of the present invention moves the lens barrier to cover an opening in the body of the camera only when the lens barrel is withdrawn through the opening into the camera body to an extent sufficient to prevent interference between the lens barrel and the lens barrier. A switching mechanism causes a common drive source to alternately power either a lens barrel drive or a lens barrier drive in a manner preventing such interference.

The camera preferably includes a holding member coupled to the switching mechanism and able to hold the switching mechanism in engagement with the lens barrel drive. A release member also preferably is provided for causing the holding member to release the engagement between the switching mechanism and the lens barrel drive.

To avoid damage to the camera when external forces are applied to the lens barrel, the camera preferably includes a spring coupled to the lens barrier and urging the lens barrier toward its closed position. The spring absorbs external forces tending to cause the lens barrier to open, thereby preventing damage.

BRIEF DESCRIPTION OF THE DRAWINGS

The invention will be described in detail with reference to the following drawings in which like reference numerals refer to like elements and wherein:

FIG. 7 is a flow chart showing operation of the lens barrel and lens barrier of the FIG. 1 camera when a main power switch is turned ON.

DETAILED DESCRIPTION OF PREFERRED EMBODIMENTS

Figure 1:
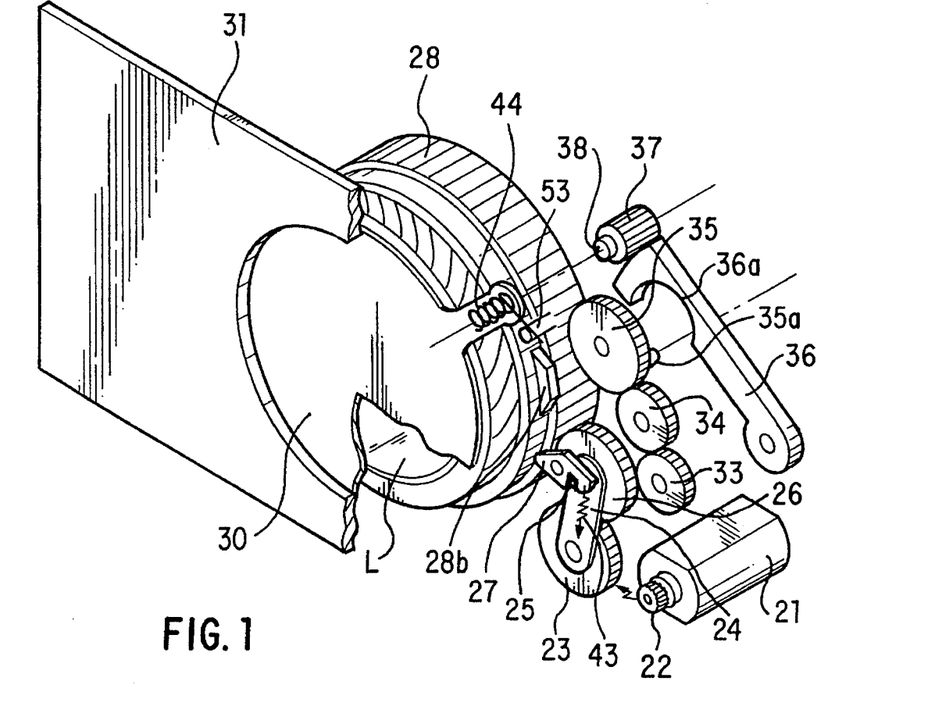
FIG. 1 is a perspective view of a camera according to an embodiment of the present invention.
Figure 2:
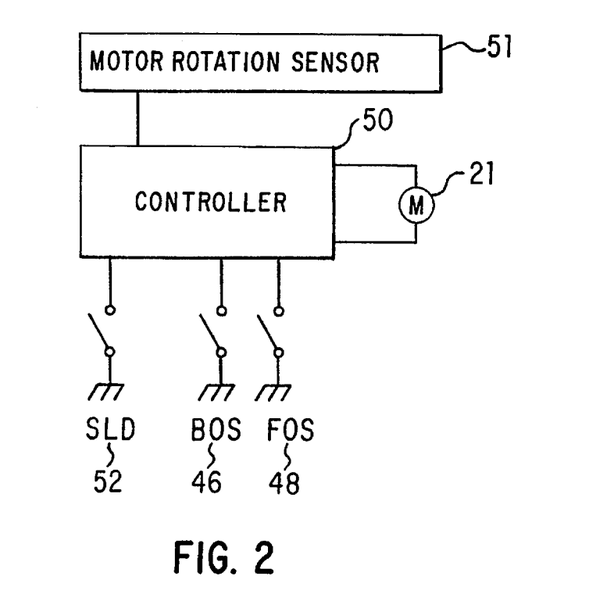
FIG. 2 is a block diagram showing a drive controller of the lens barrel and the lens barrier according to the FIG. 1 embodiment.
Figure 3A:
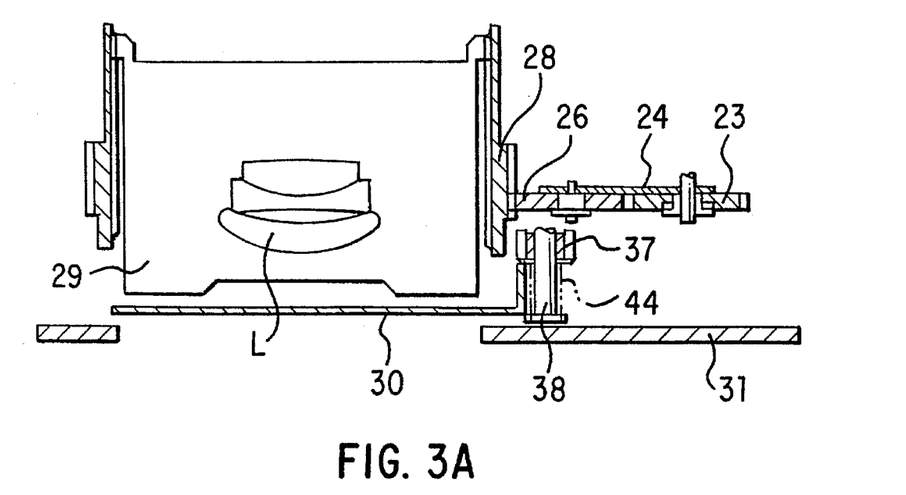
FIGS. 3A and 3B are cross-sectional and front views, respectively, of the FIG. 1 camera in an OFF state.
Figure 3B:
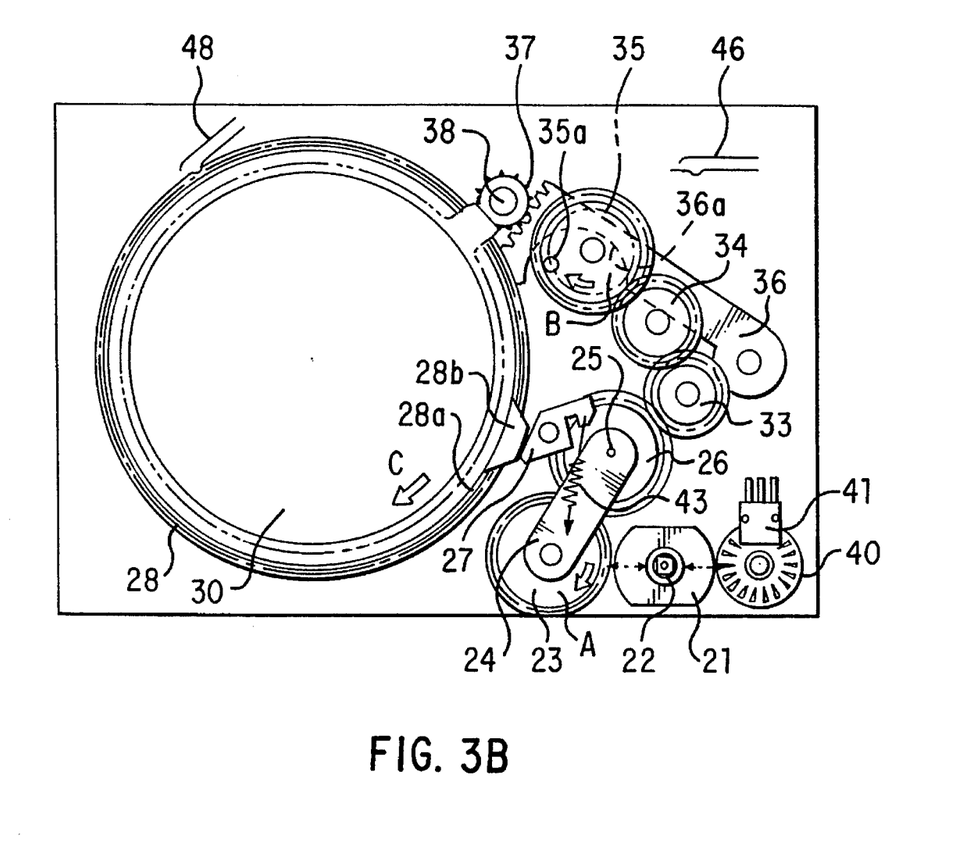
Figure 4A:
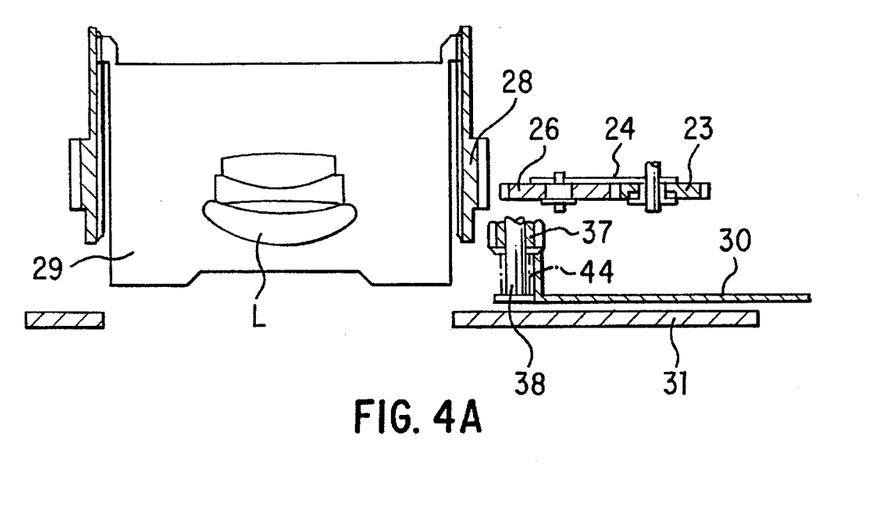
FIGS. 4A and 4B are cross-sectional and front views, respectively, of the FIG. 1 camera in a barrier-open state.
Figure 4B:
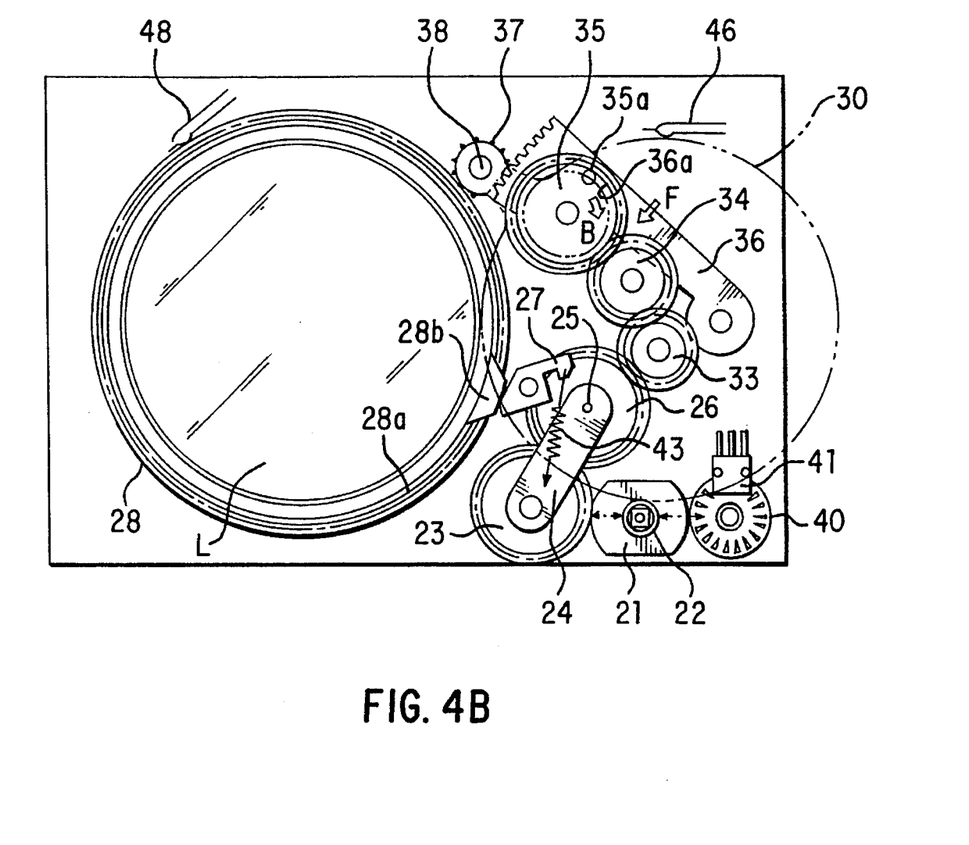
Figure 5A:
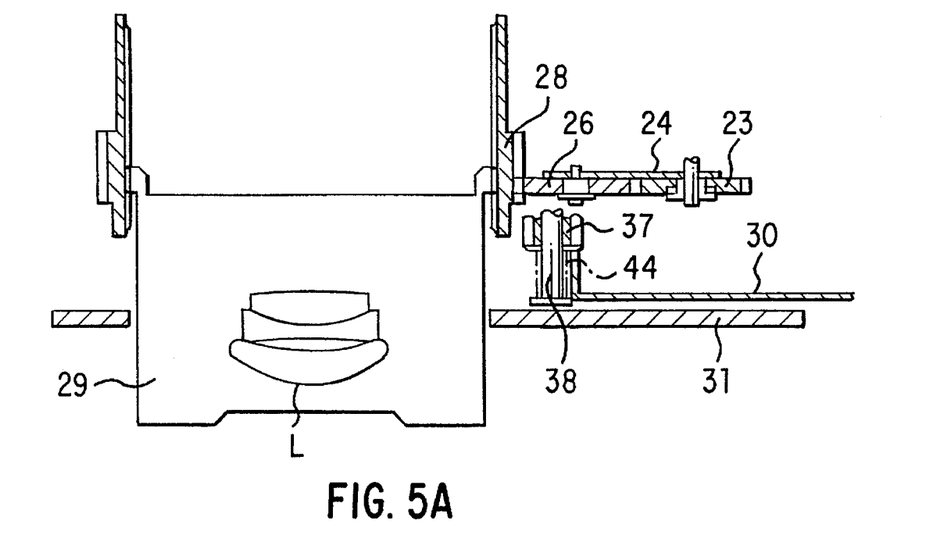
FIGS. 5A and 5B are cross-sectional and front views, respectively, of the FIG. 1 camera in an ON state.
Figure 5B:
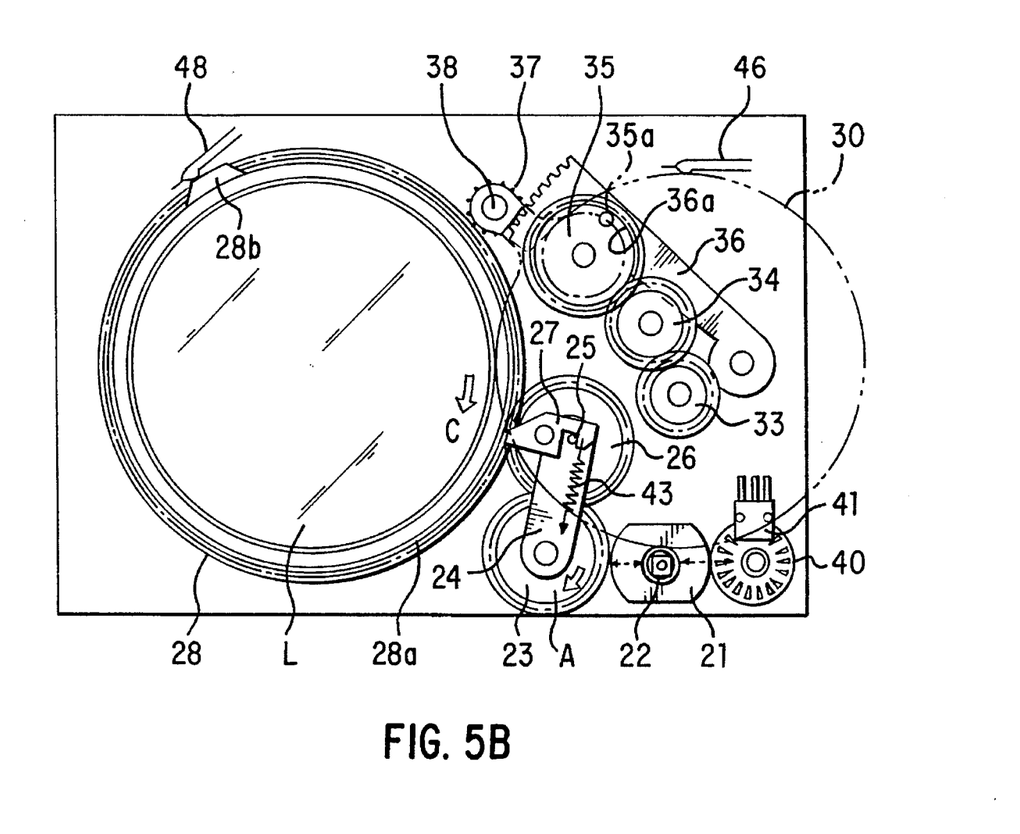

FIGS. 1–3 show an embodiment of a camera according to the present invention. FIG. 1 is a perspective view showing the basic structure of the lens barrel, the lens barrier and their respective drives in a camera according to the present invention, in which the lens barrel is in a withdrawn position and the lens barrier is in a closed position. FIG. 2 is a block diagram of a controller of the lens barrel drive and the lens barrier drive. FIGS. 3A and 3B are a cross-sectional view showing the FIG. 1 camera in an assembled state, and a front view of the camera, respectively. FIGS. 4A–4B show the lens barrier as it moves toward an open position, and FIGS. 5A–5B show the lens barrel as it moves toward an extended position.

An explanation will now be provided concerning lens barrel 29, which scrolls in and out of camera body 31, lens barrier 30, which opens and closes in front of photographic lens L held in lens barrel 29, and their respective drive systems and drive sources, with reference to FIGS. 1, 3A and 3B.

Drive source 21, which preferably is an electric motor, includes a motor shaft onto which gear 22 is pressed or otherwise affixed. Motor 21 drives gear 23 of a switching mechanism preferably via a string of gears, not shown in the drawings, between motor 21 and gear 23. Of course, alternative means may be used to transmit rotational power between motor 21 and gear 23. Gear 23 is a solar gear for planetary gear 26, which is engaged with gear 23. Planetary gear structure plate 24 connects solar gear 23 and planetary gear 26 so that the positional relationship between gears 23 and 26 is substantially fixed.

The camera according to FIG. 1 includes a locking mechanism to restrict shifting of planetary gear structure plate 24. Shaft 25 protrudes from planetary gear structure plate 24, preferably adjacent planetary gear 26, and is used as a stop component to restrict shifting of planetary gear structure plate 24 and, consequently, planetary gear 26. Stop lever 27 functions as a holding member and preferably is mounted on a shaft on part of the camera body, restricting shifting o planetary gear 26 by engaging shaft 25. Spring 43 applies a spring force to stop lever 27, urging stop lever 27 toward shaft 25.

Large gear 28 is a drive for lens barrel 29 and is mounted on the perimeter of lens barrel 29, preferably through a helicoid (i.e., screw) coupling. Large gear 28 is rotatably driven by planetary gear 26 after planetary gear 26 shifts toward and engages large gear 28. Lens barrel 29 holds photographic lens L and linearly scrolls into and out of the camera body as large gear 28 rotates. A linear motion key (not illustrated) preferably limits the movement of lens barrel 29.

Lens barrier 30 is mounted on shaft 38 so as to rotate and selectively open and close the opening in front plate 31 of the camera body, which is partially shown in the drawing. Lens barrier 30 moves to cover and to uncover the front of lens barrel 29 when lens barrel 29 is scrolled into the camera body, that is, when lens barrel 29 is in a collapsed state. The part of lens barrier 30 that closes the opening in front plate 31 preferably has the appearance of a flat plate.

A drive for the lens barrier will now be described. Gear 33 transmits rotational motion of planetary gear 26 to idle gear 34, which engages gear 35. Alternative gear arrangements between gear 33 and gear 35 also are possible. Pin 35a protrudes from the back side of gear 35, as viewed in FIG. 1, and engages and moves shift lever 36. A toothed edge of shift lever 36 engages and rotates gear 37, which preferably is rotatably mounted on shaft 38.

Lens barrier 30 preferably is solidly fixed, by means of caulking, for example, to a portion of gear 37, which rotates on shaft 38. Lens barrier 30 thus rotates with gear 37. In other words, rotation of gear 37 causes lens barrier 30 to open and close over the front of lens barrel 29.

Slit gear 40 (FIG. 3B) has slits and preferably is moved via a string of gears (not illustrated) that extends between slit gear 40 and gear 22 on the motor shaft of motor 21. The slits in slit gear 40 pass photo-interrupter 41, which detects the slits. The number of slits that pass photo-interrupter 41 is counted by a CPU provided in controller 50, shown in FIG. 2. Photo-interrupter 41 and slit gear 40 thus function as a motor rotation amount recognition device, corresponding to motor rotation sensor 51 shown in FIG. 2, and provide feedback for controlling the amount of scrolling of lens barrel 29.

Toggle spring 44 serves as spring means providing spring force in the direction of opening when the lens barrier 30 is in the open position and in the direction of closing when lens barrier 30 is in the closed position. One end of spring 44 preferably is attached to lens barrier 30, and the other end preferably is attached to gear 35.

Barrier-open signal switch (BOS) 46 is used to recognize when lens barrier 30 is in an open state, and, as is clear from FIG. 4B, is turned ON when it is depressed by brush components of lens barrier 30. Focus ordinary switch (FOS) 48 produces an ordinary signal when the scrolling position of the lens barrel 29 is controlled. Switch 48 is turned ON due to rotation of cam surface 28b, which functions as a release member, provided on surface 28a adjacent gear 28. Slide switch (SLD) 52 is the main power switch of the camera and controls whether the camera is ON or OFF. The foregoing structure allows the motion of lens barrel 29 and the motion of lens barrier 30 to be controlled separately, as is clear from FIGS. 3–5.

Operation of the camera according to the invention will now be described. When slide switch SLD 52 is OFF and lens barrel 29 and lens barrier 30 are in the OFF state (barrier-closed state), as shown in FIGS. 3A–3B, if slide switch SLD 52 is turned ON, lens barrier 30 rotates to the open state and lens barrel 29 remains in a collapsed state as shown in FIGS. 4A and 4B. Then, lens barrel 29 scrolls outwardly until the ON position shown in FIGS. 5A and 5B is reached. Subsequently, when slide switch SLD 52 is turned OFF, the camera returns to the OFF state shown in FIGS. 3A and 3B; lens barrel 29 scrolls into the camera until it is collapsed, and then lens barrier 30 rotates from the open state shown in FIGS. 4A and 4B to the closed state shown in FIGS. 3A and 3B.

Figure 7:
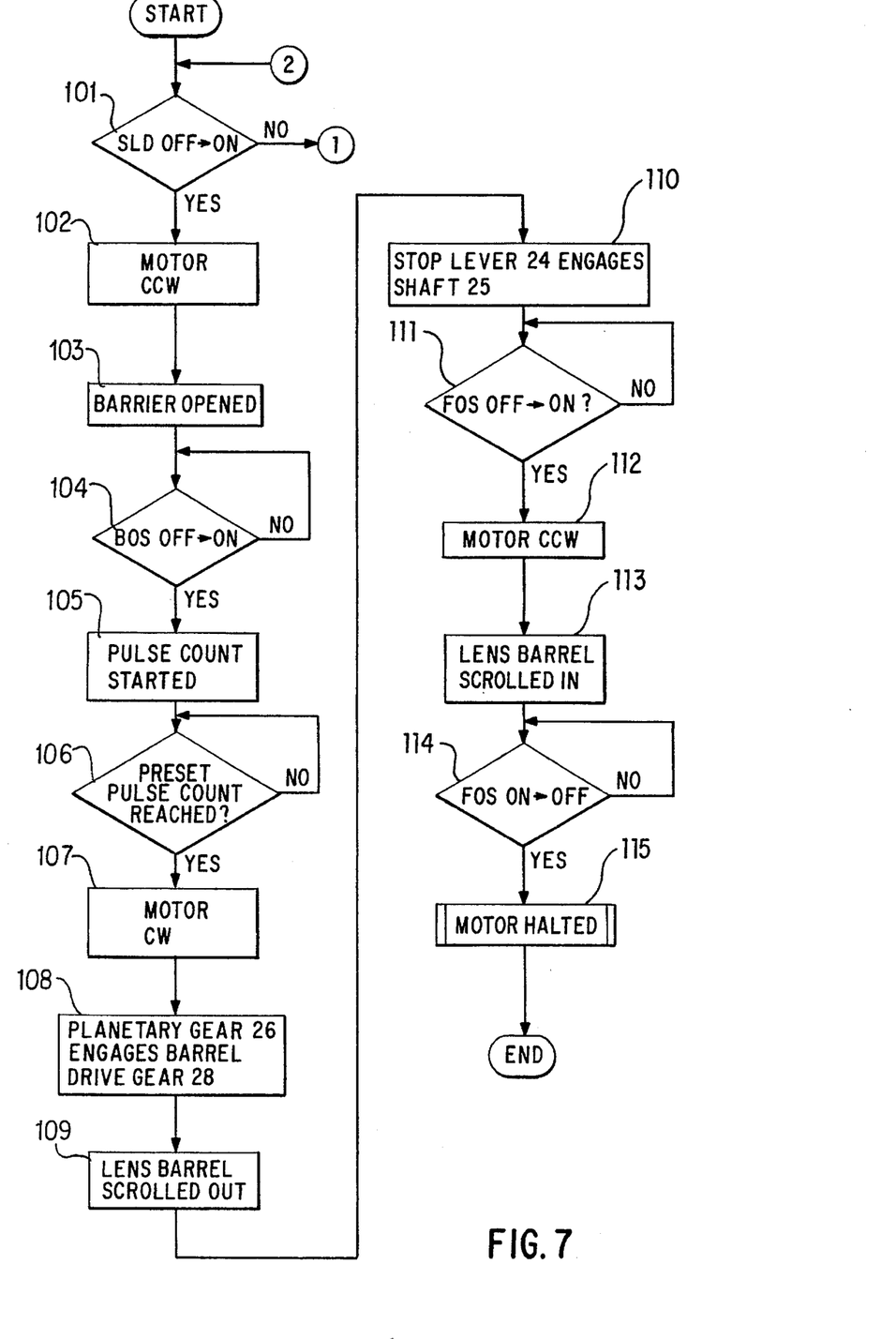
Figure 8:
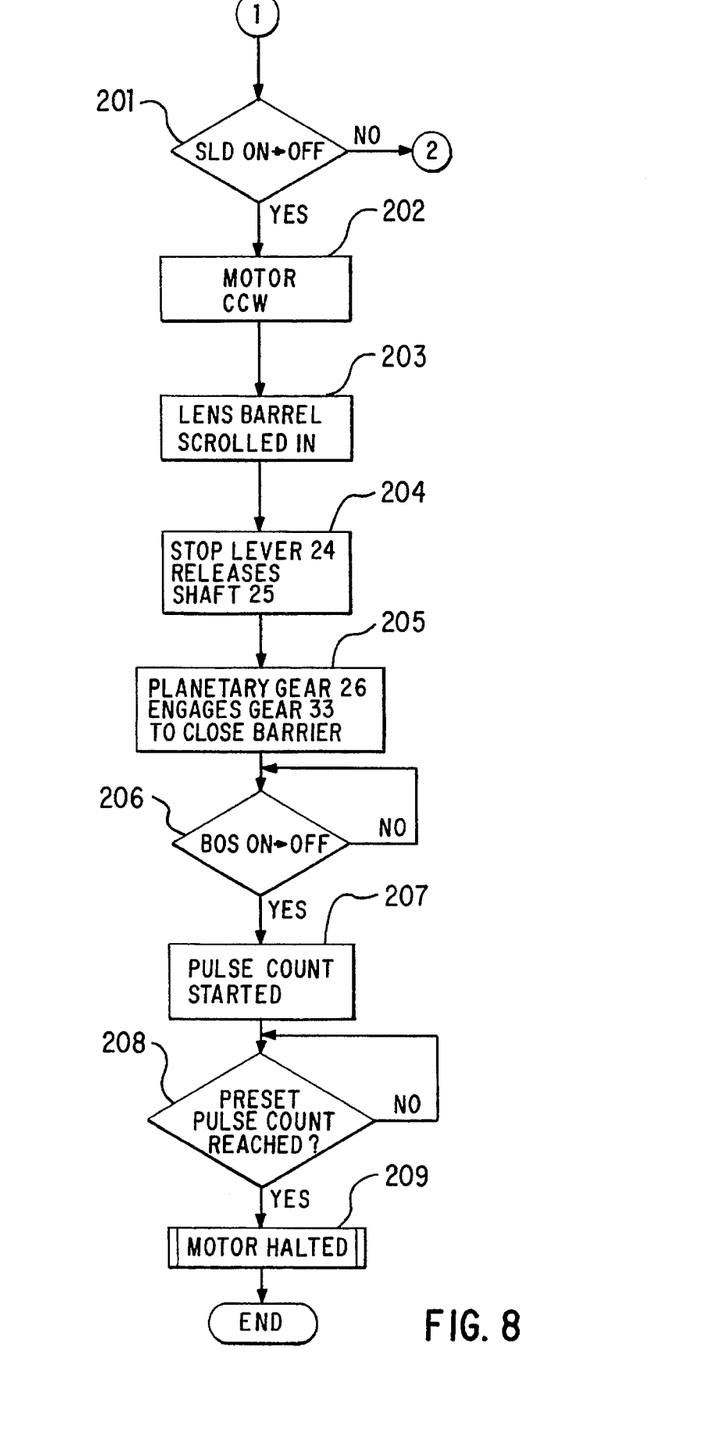
FIG. 8 is a continuation of the FIG. 7 flow chart.

These motions are explained in detail hereafter, with reference to FIGS. 3A–5B and the flow charts shown in FIGS. 7–8.

First, in the OFF state (barrier-closed state) shown in FIGS. 3A and 3B, when slide switch (power source switch) SLD 52, which serves as the main switch, is turned ON, electric motor 21 rotates gear 22 counterclockwise (steps 101 and 102 of FIG. 7). Gear 22 causes solar gear 23 to rotate in the direction indicated by arrow A in FIG. 3B, preferably via a string of gears (not shown). Next, gear 35 is caused to rotate in the direction indicated by arrow B in FIG. 3B, via planetary gear 26 and gears 33 and 34.

At this point, pin 35a, which protrudes from the back of gear 35, pushes up on a preferably semicircular cam 36a, which is a curved surface formed in shift lever 36. Shift lever 36 consequently shifts from the position shown in FIG. 3B to the position shown in FIG. 4B.

The end of shift lever 36 adjacent cam 36a is a gear component that engages and meshes with gear 37. Gear 37 preferably rotates freely on shaft 38, so that rotation of shift lever 36 is transmitted to gear 37. Because lens barrier 30 is attached to gear 37, lens barrier 30 rotates to its open position due to the rotational shifting motion of shift lever 36 and the resulting rotational motion of gear 37 (step 103 of FIG. 7).

Rotation of lens barrier 30 causes the brush component of lens barrier 30 to turn BOS (barrier-open signal switch) 46 ON (step 104 of FIG. 7), through which the CPU of controller 50 recognizes that lens barrier 30 is in an open state. A pulse count is started and it is determined whether a certain preset pulse count number has been reached (steps 105 and 106 of FIG. 7). After waiting for a preset pulse signal, which is issued when the pulse count number is reached, the CP causes electric motor 21 to reverse rotation to the clockwise direction (step 107 of FIG. 7).

The CPU waits for the preset pulse signal, before causing reverse rotation of electric motor 21, to prevent lens barrel 29 from being scrolled out before barrier 30 is completely opened, which, depending on the precision with which BOS 46 is attached to the camera, could otherwise occur.

A second reason that the CPU waits for the preset pulse signal before reversing the rotation of electric motor 21 is that if pin 35a is stopped before it has pushed cam 36a sufficiently upward, cam surface 36a might undesirably push the pin 35a downward, causing barrier 30 to close again, because shift lever 36 is constantly urged to rotate in the counterclockwise direction by the spring force from toggle spring 44.

Alternatively, BOS (barrier-open signal switch) 46 can be positioned such that the problems described above do not arise. It is then appropriate to have motor 21 reverse directions simultaneously with BOS (barrier-open signal switch) 46 being turned ON, because the overstroke amount of barrier 30 can be made large. Further, BOS (barrier-open signal switch) 46 can be positioned and designed to recognize the shifting motion of shift lever 36 instead of lens barrier 30.

When electric motor 21 reverses direction and rotates in the clockwise direction, as described above, the rotation transmission system driven by motor 21 is switched from rotating lens barrier 30 to rotating lens barrel 29.

When motor 21 reverses direction, planetary gear 26 separates from gear 33, due to the rotation of planetary gear 26 on gear 23 and due to the consequent shifting of planetary gear structure plate 24. Planetary gear 26 engages large gear 28 around lens barrel 29 (step 108 of FIG. 7). Large gear 28 then begins to rotate in the counterclockwise direction, due to the rotation of planetary gear 26. Consequently, lens barrel 29 begins scrolling out, and stop lever 27 is placed in a stop position (steps 109 and 110 of FIG. 7) in which it engages shaft 25.

When lens barrel 29 has been scrolled to a preset position, cam component 28b switches FOS (focus ordinary switch) 48 from OFF to ON (step 111 of FIG. 7). The CPU of controller 50 causes electric motor 21 to reverse rotation to the counterclockwise direction, scrolling lens barrel 29 in, but only until cam component 28b switches FOS (focus ordinary switch) 48 from ON to OFF (steps 112–114 of FIG. 7). Motor 21 is then halted (step 115 of FIG. 7). Rotation of motor 21 is thereby controlled and stopped in a preset position, thereby stopping the lens barrel 29 in a preset position.

Next, the camera waits for the photographic operation to be completed and slide switch SLD 52 to be turned OFF. When slide switch SLD 52 is turned OFF, electric motor 21 rotates in the counterclockwise direction (steps 201 and 202 of FIG. 8). Gear 23 rotates in the direction indicated by arrow A in FIG. 5B, causing planetary gear 26 to rotate and causing large gear 28 to rotate in the direction indicated by arrow C in FIG. 5B.

At this time, through the effects of the planetary gear structure, planetary gear 26 tries to shift toward gear 33, but because shaft 25 of planetary gear structure plate 24 is held by stop lever 27, planetary gear 26 and large gear 28 remain fitted together.

Accordingly, through rotation of solar gear 23 in the direction indicated by arrow A, large gear 28 rotates in the direction indicated by arrow C. Because the helicoid is designed with counterclockwise threading, lens barrel 29 is scrolled in from the condition shown in FIG. 5A, collapsing inward (step 203 of FIG. 8).

As large gear 28 rotates in the direction indicated by arrow C, lens barrel 29 collapses inward and cam projection 28b causes stop lever 27 to rotate against spring 43. Stop lever 27 thus is moved to a release position (step 204 of FIG. 8), releasing shaft 25 of planetary gear structure plate 24, and causing shaft 25 to release the operative connection between motor 21 and gear 28.

At this point, solar gear 23 continues to rotate in the direction indicated by arrow A in FIG. 5B. Consequently, simultaneous with the release of shaft 25, planetary gear 26 shifts toward gear 33 and planetary gear structure plate 24 shifts away from lens barrel 29 toward lens barrier 30. The rotation transmission system thus switches from lens barrel 29 to lens barrier 30 (step 205 of FIG. 8). Accordingly, power transmission to large gear 28 is terminated, and lens barrel 29 stops in its collapsed state.

When shaft 25 is released by stop lever 27, planetary gear 26 fits together with gear 33 and causes it to rotate, through which action gear 35 is caused to rotate in the direction indicated by arrow B in FIG. 4B. Pin 35a, protruding from the back surface of gear 35, moves out of the semicircular cam 36a cut into shift lever 36, thereby shifting shift lever 26 in the direction indicated by arrow F. Shift lever 36 starts to shift simultaneously with the rotation of gear 35 in the direction indicated by arrow B. At the same time, lens barrier 30, which is continuously receiving from toggle spring 44 a spring force in the direction of closing, starts to rotate towards its closed position.

After BOS (barrier-open signal switch) 46 is turned OFF due to rotation of lens barrier 30 away from BOS 46, a pulse count is started and continues until a preset number of pulses are counted. The preset number of pulses defines a time period long enough to allow gear 35 to rotate pin 35a out of cam 36a, but short enough so that pin 35a does not re-engage cam 36a and push shift lever 36 upward. After the preset number of pulses are counted, it is recognized that lens barrier 30 is in its closed position, and motor 21 is halted (steps 206–209 of FIG. 8).

Figure 6:
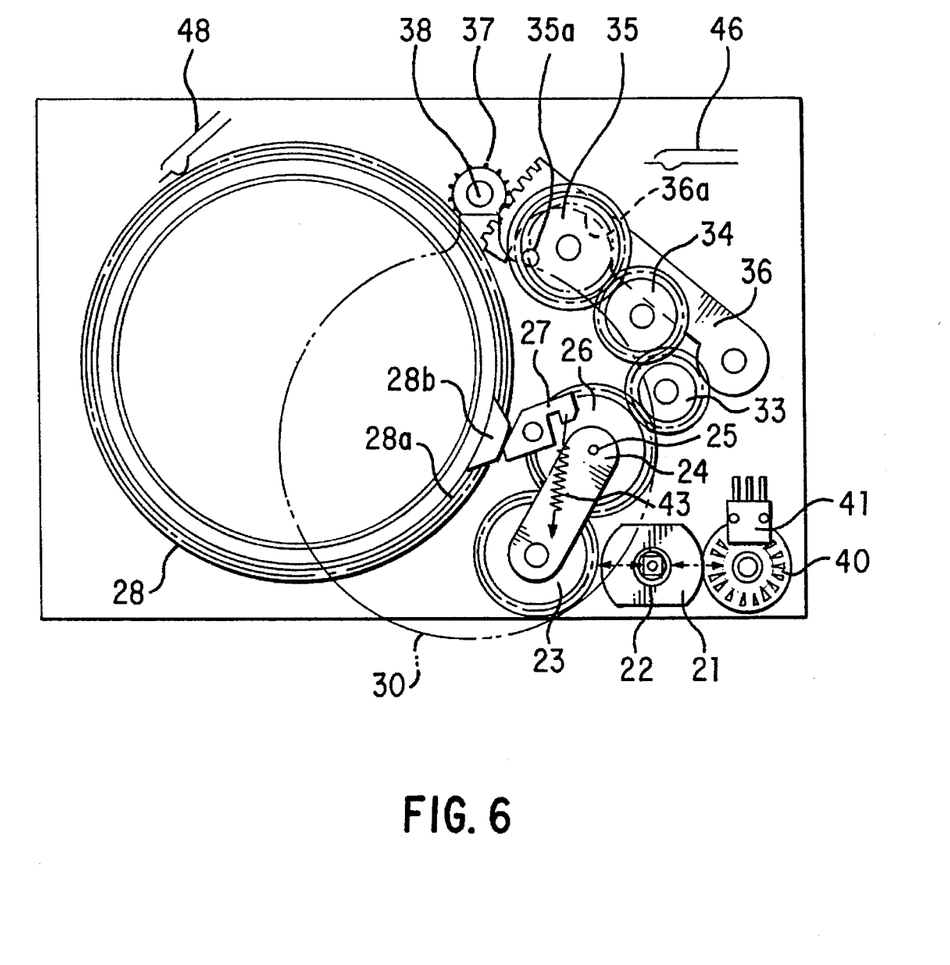
FIG. 6 is a front view of the FIG. 1 camera showing lens barrier movement when an unexpected external force is applied to the barrier.

FIG. 6 shows the situation in which barrier 30 is forced open because of the application of an unanticipated external force when the power source is OFF. When lens barrier 30 is forced open, the external force is absorbed by toggle spring 44. Because the external force ultimately is not applied to anything other than toggle spring 44, damage to lens barrier 30 and the camera body is prevented.

With a camera according to the present invention, unlike the camera shown in the disclosure of Japanese Patent publication No. 4-301544, mentioned above, the opening in front plate 31 of the camera body is not completely blocked off, but is only covered by barrier 30. This is sufficient to prevent debris from entering the camera and to protect photographic lens L.

It also is possible to structure the camera so that the opening in front plate 31 of the camera body is completely covered by barrier 30 and so that barrier 30 does not open, even if an external force is applied. It is thus possible to obtain a sealed, stable and fully flat design, making insertion of the camera into its case easier.

This complete sealing action, however, creates the following problem. The external force produces stress on lens barrel 29, which can cause a reduction in the durability of the helicoid threads. Furthermore, in the above example, it always is necessary to completely release the sealing action when the power source is turned ON and OFF, or to scroll the lens barrel out after this release, causing inefficient and time-consuming operation. Moreover, a spring structure that forces barrier 30 in the direction of collapsing becomes desirable, increasing structural complexity and costs. In addition, in the above example, it is desirable to have a convex component on barrier 30 to achieve a complete seal. Extra space is necessary to accommodate this convex component when the barrier is opening, increasing the size of the camera.

The present invention overcomes these disadvantages and addresses them in a manner such that, although the camera is not completely sealed, the opening in front plate 31 of the camera body is covered by a single barrier 30.

Furthermore, the present invention overcomes problems associated with external forces, by using the disclosed barrier opening and closing structure and having toggle spring 44, which applies a spring force to barrier 30 in the direction of closing. Moreover, the present invention is advantageous because cam 36a can be formed, if desired, on only one side of shift lever 36. Shift lever 36 may therefore be a notched component. Cam 36a can be shaped in such a way that it can dodge pin 35a when barrier 30 opens due to external force. Furthermore, advantages are obtained by using a structure that conserves space by switching power transmission between lens barrel 29 and barrier 30 simply by producing forward and reverse rotation of a single motor 21.

The present invention is not limited to the structure of the embodiments discussed above, but can be conceived in various forms including variations and alterations in the shape of the various camera components.

In summary, a camera according to the invention allows lens barrel 29 to scroll in and out and allows the front of lens barrel 29 to be covered by lens barrier 30 when lens barrel 30 is scrolled in. Use of the present invention yields positive results.

As explained above, according to the disclosed embodiment incorporating the present invention, a camera is equipped with a lens barrel that can move between a scrolled-out position, in which it protrudes from the front of the camera, and a scrolled-in position, in which it is withdrawn from the front of the camera. The camera includes a lens barrier that can move between the closed position, in which it is covering the front of the lens barrel, and an open position, in which it is withdrawn from the front of the lens barrel. A lens barrel drive scrolls the lens barrel in and out. A lens barrier drive opens and closes the lens barrier. An electric motor functions as the drive source for the lens barrel drive and the lens barrier drive. A switching device switches the rotation transmission system between the lens barrel drive and the lens barrier drive. The switching device is structured so that it can switch only at times when it is possible for the lens barrier to move in front of the lens barrel. Consequently, despite having a simple structure, movement of the lens barrier between the closed position, in which it is in front of the lens barrel that is in the collapsed state, and an open position, where the lens barrier is withdrawn, is extremely simple to accomplish. Moreover, the barrier-closed state can be absolutely maintained when necessary.

With such a structure, debris and dust cannot enter the camera body easily, thereby appropriately protecting the photographic lens and lens barrel.

In addition, with the disclosed embodiment, the structure is such that the lens barrier, which can move between the closed position in which it is covering the front of the lens barrel and an open position in which it is withdrawn from the front of the lens barrel, is under spring force in the direction of closing. When the lens barrier is positioned in the closed position covering the front of the lens barrel, which is in he collapsed state, therefore, even if an external force is applied in the direction of opening, this force is absorbed because of the spring force on the barrier in the direction of closing. The lens barrier does not open, even if, for instance, it is accidentally brushed by a finger or the like, giving superior performance in terms of safety because the closed condition is maintained.

Furthermore, the disclosed camera is equipped with an electric motor that functions as the drive source for the lens barrel drive that scrolls the lens barrel in and out, and for the lens barrier drive that alternately performs, through one-directional driving, the opening and closing of the lens barrier, which is selectively provided with a spring force in the direction of closing. The camera is provided with a planetary gear that forms part of the lens barrel drive upon rotation by the electric motor in the primary direction, and that also forms part of the lens barrier drive by shifting toward the lens barrier drive upon rotation by the electric motor in the secondary direction. The camera includes a stop lever supported by a shaft, to prevent shifting of the planetary gear toward the lens barrier drive and to release the planetary gear. The camera also includes a cam that engages the stop lever to release the planetary gear by performing rotational movement simultaneously with the scrolling in and scrolling out of the lens barrel, the cam engaging the stop lever when the lens barrel has scrolled into the camera far enough that the lens barrier can move in front of the lens barrel. Because of this, using a single electric motor, a planetary gear that switches based on the direction of rotation of the motor, and a stop lever that stops the switching motion in a preset position, it is possible to scroll the lens barrel in and out and to open and close the lens barrier independently, and to perform these functions together, as necessary.

Furthermore, with this kind of structure, the action of scrolling the lens barrel in and out and the action of opening and closing the lens barrier are performed without the use of a special switch, not only reducing cost but also allowing the lens barrier to be driven without affecting the position of the lens barrel, thereby realizing more efficient space utilization. Conversely, when the lens barrel is being driven, the position of the lens barrier does not change, thereby preventing damage caused by interference between these two mechanisms.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A camera, comprising:

a camera body having an opening;

a lens barrel movable between an extended position, in which the lens barrel protrudes through the opening in the camera body, and a withdrawn position, in which the lens barrel is withdrawn into the body;

a lens barrier movable between a closed position, in which the lens barrier covers the opening, and an open position, in which the lens barrier does not cover the opening;

a lens barrel drive coupled to the lens barrel to move the lens barrel between the extended position and the withdrawn position;

a lens barrier drive coupled to the lens barrier to move the lens barrier between the open position and the closed position;

a drive source for powering the lens barrel drive and the lens barrier drive;

a switching mechanism engaged with the drive source and selectively engageable with the lens barrel drive and with the lens barrier drive to cause the drive source to alternately power either the lens barrel drive or the lens barrier drive, the switching mechanism engaging the lens barrier drive to move the lens barrier from the open position toward the closed position only when the lens barrel drive has withdrawn the lens barrel through the opening into the body to an extent sufficient to prevent interference between the lens barrel and the lens barrier; and a holding member coupled to the switching mechanism and holding the switching mechanism in engagement with the lens barrel drive when the lens barrel is in the extended position such that the drive source powers the lens barrel drive.

2. A camera according to claim 1, wherein:

the switching mechanism comprises at least one gear, the at least one gear being shiftable between a lens barrel driving position, in which the at least one gear engages the lens barrel drive, and a lens barrier driving position, in which the at least one gear engages the lens barrier drive;

the drive source powers the lens barrel drive through the at least one gear when the at least one gear is in the lens barrel driving position; and the drive source powers the lens barrier drive through the at least one gear when the at least one gear is in the lens barrier driving position.

3. A camera according to claim 2, wherein:

the drive source alternately rotates the at least one gear in either of two opposed rotational directions; and reversing the rotational direction of the drive source causes the at least one gear to shift between the lens barrel driving position and the lens barrier driving position.

4. A camera according to claim 2, wherein:

the at least one gear comprises a planetary gear;

the switching mechanism further comprises a solar gear engaged with the planetary gear; and the planetary gear rotates about the solar gear as the planetary gear shifts between the lens barrel driving position and the lens barrier driving position.

5. A camera according to claim 2, wherein the holding member includes a locking mechanism engageable with the at least one gear to lock the at least one gear in the lens barrel driving position.

6. A camera according to claim 5, wherein the holding member that selectively engages a shaft of the at least one gear to hold the at least one gear in the lens barrel driving position.

7. A camera according to claim 6, further comprising a release member connected to the lens barrel to cause the holding member to release the shaft as the lens barrel moves toward the withdrawn position, thereby allowing the at least one gear to shift toward the lens barrier driving position, wherein the release member causes the holding member to release the shaft only when the lens barrel is withdrawn through the opening into the body to an extent sufficient to prevent interference between the lens barrel and the lens barrier.

8. A camera according to claim 7, wherein the holding member includes a lever and the release member includes a cam, the cam engaging the lever to cause the lever to release the shaft.

9. A camera according to claim 7, wherein the release member rotates into engagement with the holding member as the lens barrel is withdrawn into the body.

10. A camera according to claim 1, wherein the drive source includes an electric motor.

11. A camera according to claim 1, wherein:

the drive source is drivable in two drive directions;

the drive source powers the lens barrel drive when the drive source is driven in one of the two drive directions;

the drive source powers the lens barrier drive when the drive source is driven in the other of the two drive directions; and when the drive direction of the drive source is changed from said other drive direction to said one drive direction, the switching mechanism causes the drive source to change from powering the lens barrier drive to powering the lens barrel drive.

12. A camera according to claim 1, further comprising a spring coupled to the lens barrier and urging the lens barrier toward the closed position, wherein the spring absorbs forces external to the camera that tend to cause the lens barrier to move from the closed position toward the open position.

13. A camera according to claim 1, further comprising a release member for causing the holding member to release the engagement between the switching mechanism and the lens barrel drive.

14. A camera according, to claim 1, wherein the lens barrier drive comprises:

a rotatable lever having a curved surface, the rotatable lever linked to the lens barrier so that rotation of the rotatable lever causes the lens barrier to move between the open position and the closed position; and a drive member engaged with and movable along the curved surface, the switching mechanism engageable with the drive member so that as the drive source powers the lens barrier drive, the drive member moves along the curved surface to rotate the rotatable lever and thereby move the lens barrier between the open position and the closed position.

15. A camera according to claim 1, wherein the lens barrier is rotatably mounted to rotate between the open position and the closed position.

16. A camera, comprising:

a camera body having an opening;

a lens barrel movable between an extended position, in which the lens barrel protrudes through the opening and extends out of the camera body, and a withdrawn position, in which the lens barrel is withdrawn into the camera body;

a lens barrier movable between a closed position, in which the lens barrier covers the opening, and an open position, in which the lens barrier does not cover the opening;

lens barrel drive means for moving the lens barrel between the extended position and the withdrawn position;

lens barrier drive means for moving the lens barrier between the open position and the closed position;

drive means for powering the lens barrel drive and the lens barrier drive;

switching means for selectively engaging the drive means with the lens barrel drive means and with the lens barrier drive means to cause the drive means to alternately power either the lens barrel drive means or the lens barrier drive means to move the lens barrier from the open position toward the closed position only when the lens barrel drive means has withdrawn the lens barrel through the opening into the body to an extent sufficient to prevent interference between the lens barrel and the lens barrier; and locking means for locking the drive means in operative connection with the lens barrel drive means when the lens barrel is in the extended position, such that the drive means powers the lens barrel drive means.

17. A camera according to claim 16, wherein the switching means includes:

releasing means for causing the locking means to release the operative connection between the drive means and the lens barrel drive means when the lens barrel reaches a position in which the lens barrel will not interfere with movement of the lens barrier to the closed position.

18. A camera according to claim 16, further comprising biasing means for biasing the lens barrier in the closed position when the lens barrier is located in the closed position.

19. A method of operating a camera having a lens barrel movable between an extended position and a withdrawn position, and having a lens barrier movable between a closed position and an open position, comprising the steps of:

powering a lens barrel drive for the lens barrel from a drive source by engaging the lens barrel drive with a drive gear driven by the drive source;

locking the drive gear to the lens barrel drive;

driving the lens barrel from the extended position toward the withdrawn position with the lens barrel drive;

powering a drive for the lens barrier from the drive source by unlocking the lens barrel drive from the drive gear and engaging the lens barrier drive with the drive gear, the lens barrier drive powering step occurring only when the lens barrel has moved into the body to an extent sufficient to prevent interference between the lens barrel and the lens barrier; and driving the lens barrier from the open position toward the closed position.

20. A method according to claim 19, wherein the drive gear is a planetary gear, and the lens barrier drive powering step includes the step of rotating the planetary gear about a solar gear.

21. A method according to claim 19, wherein the step of unlocking the lens barrel drive includes releasing a locking member that locks the drive gear to the lens barrel drive by rotating a release member coupled to the lens barrel into engagement with the locking member to disengage the locking member as the lens barrel moves into the withdrawn position.

22. A method according to claim 19, wherein the lens barrier drive powering step includes the step of reversing a drive direction of the drive gear.

23. A method of claim 19, further comprising biasing the lens barrier in the closed position when the lens barrier is located in the closed position.

* * * * *